(12) United States Patent
Otsuka et al.

(10) Patent No.: US 7,151,064 B2
(45) Date of Patent: Dec. 19, 2006

(54) OPTICAL GLASS SUITABLE FOR MOLD FORMING

(75) Inventors: Masaaki Otsuka, Saitama (JP); Naruhito Sawanobori, Saitama (JP); Shinobu Nagahama, Saitama (JP)

(73) Assignee: Sumita Optical Glass, Inc., Saitama (JP)

( * ) Notice: Subject to any disclaimer, the term of this patent is extended or adjusted under 35 U.S.C. 154(b) by 357 days.

(21) Appl. No.: 10/469,288

(22) PCT Filed: Oct. 29, 2002

(86) PCT No.: PCT/JP02/11240

§ 371 (c)(1), (2), (4) Date: Aug. 28, 2003

(87) PCT Pub. No.: WO03/037813

PCT Pub. Date: May 8, 2003

(65) Prior Publication Data

US 2004/0087428 A1    May 6, 2004

(30) Foreign Application Priority Data

Oct. 30, 2001   (JP)   ............................ 2001-332531

(51) Int. Cl.
C03C 3/247   (2006.01)
C03C 3/17    (2006.01)

(52) U.S. Cl. .......................................... 501/44; 501/48

(58) Field of Classification Search ............ 501/45–48, 501/44
See application file for complete search history.

(56) References Cited

U.S. PATENT DOCUMENTS

| | | | | |
|---|---|---|---|---|
| 3,656,976 A | * | 4/1972 | Izumitani et al. | 501/44 |
| 4,333,848 A | * | 6/1982 | Myers et al. | 252/301.4 P |
| 4,362,819 A | | 12/1982 | Olszewski et al. | |
| 4,363,879 A | * | 12/1982 | Broemer et al. | 501/44 |
| 4,433,062 A | * | 2/1984 | Courbin et al. | 501/44 |
| 5,529,961 A | * | 6/1996 | Aitken et al. | 501/45 |
| 6,156,684 A | * | 12/2000 | Sato et al. | 501/45 |
| 6,566,289 B1 | * | 5/2003 | Aronica et al. | 501/24 |
| 2004/0087428 A1 | * | 5/2004 | Otsuka et al. | 501/48 |

FOREIGN PATENT DOCUMENTS

| | | |
|---|---|---|
| DE | 3105664 A1 | 1/1982 |
| EP | 365235 A2 | 4/1990 |
| FR | 2476631 A1 | 8/1981 |
| GB | 2069994 A | 6/1983 |
| JP | 40-14301 | 7/1965 |
| JP | 57-27941 | 2/1982 |
| JP | 59-33545 | 8/1984 |
| JP | 60-171244 | 9/1985 |
| JP | 60-210545 | 10/1985 |
| JP | 61-36136 | 2/1986 |
| JP | 63-144141 | 6/1988 |
| JP | 2-116642 | 5/1990 |
| JP | 2-124743 | 5/1990 |
| JP | 3-40934 | 2/1991 |
| JP | 5-132339 | 5/1993 |
| JP | 8-183632 | 7/1996 |
| JP | 9-278479 | 10/1997 |
| JP | 9-301735 | 11/1997 |
| JP | 11-139845 | 5/1999 |
| JP | P2003-26439 A | 1/2003 |
| KR | 97-897 B1 | 1/1987 |
| NL | 8100918 A | 9/1981 |

* cited by examiner

Primary Examiner—J. A. Lorengo
Assistant Examiner—Elizabeth A. Bolden
(74) Attorney, Agent, or Firm—McDermott Will & Emery LLP

(57) ABSTRACT

An optical glass suitable for mold forming having a metal composition in wt % in terms of metal oxides calculated from the composition of the following components: $P_2O_5$ 34–50%, $Li_2O$ 2–9%, $Na_2O$ 7–28%, $K_2O$ 3–27%, provided that the total of $R_2O$ is 17–41% (R: Li, Na, K), $Al_2O_3$ 6.5–30%, ZnO 0–22%, BaO 0–21%, SrO 0–18%, CaO 0–16%, MgO 0–14%, provided that the total of R'O is 0–34% (R': Zn, Ba, Sr, Ca, Mg), $ZrO_2$ 0–1.5% and F 1.5–32% relative to the total weight of the oxides, and exhibits a glass transition temperature (Tg) of 350° C. or lower and a specific gravity (Sg) of 3.1 or less and is excellent in chemical durability. The optical glass can be press formed at a low temperature of about 270 to 400° C.

1 Claim, No Drawings

US 7,151,064 B2

OPTICAL GLASS SUITABLE FOR MOLD FORMING

FIELD OF THE INVENTION

This invention relates to an optical glass for molding, in particular, an optical glass for a precision molding lens capable of carrying out molding at most 400° C., having a glass transformation temperature (Tg) of at most 350° C. and specific gravity (Sg) of at most 3.1.

BACKGROUND TECHNIQUE

Of late, aspheric lenses or micro optical lenses used in the optical lens system have often been produced by a molding technique using a high precision die without polishing. However, the quality of a die suitable for molding is subject to various limitations from the respect of workability, durability and mass productivity. This indicates that the property of a glass to be molded is also limited. The most important property limited is a softening temperature. Molding of a glass having a softening temperature of 600 to 700° C. or higher, for example, has a large influence upon the life of a die and thus results in lowering of the mass productivity of lenses. Accordingly, it has been considered difficult from the standpoint of mass productivity to mold commercially available optical glasses of all kinds having been marketed and consequently, it becomes a subject of research to develop a glass excellent in moldability.

In JP-A-02-124743, for example, there is disclosed a low softening point, medium refractive index and low dispersion optical glass for precision molded lens, having a yielding point (At) of at most 500° C., refractive index (nd) of 1.53 to 1.62 and Abbe number (v d) of 59.0 to 64.0, and comprising $P_2O_5$ and ZnO, as an essential element, and 28 to 49 weight % of ZnO+BaO+SrO+CaO+MgO. This optical glass has such a feature that grinding or polishing after molding is not required because of having a low yielding point (At) and excellent stability, chemical durability, as well as melting property.

JP-A-08-183632 and JP-A-11-139845 have made similar proposals, with which lowering of the softening temperature of the glass is a common subject.

Many of these glasses, however, have softening temperatures of about 400–500° C., since if lower than this temperature range, there arises a problem that chemical durability is lowered and no practical glass is obtained. When the composition of such a glass is so selected as to correspond to the optical properties of commercially available optical glasses, a sufficient softening temperature cannot be obtained sometimes.

Phosphate glasses having relatively a lower softening temperature of oxide glasses have hitherto been proposed as a low softening point glass, for example, as shown in JP-A-60-171244, JP-A-61-036136, JP-A-02-116642, JP-A-02-124743, JP-A-03-040934, JP-A-05-132339, JP-A-08-183632, JP-A-09-278479, JP-A-09-301735, etc.

The inventors have hitherto made efforts to develop a glass capable of being subjected to molding at a low temperature, i.e. at most 400° C., in particular, about 380° C. in the above described oxide glass compositions of phosphate type, and thus have found that it is possible to incorporate a considerable quantity of $Al_2O_3$ without increasing the quantity of $P_2O_5$ while increasing in essential manner the quantity of $Li_2O$, $Na_2O$ and $K_2O$, whereby the above described problems can be solved. The present patent application has thus been filed (JP-A-2003-026439).

It is well known that in general, addition of fluorine is effective for lowering the softening temperature of glass. However, fluorophosphate glasses up to the present time have often been used for the purpose of realizing the optical properties thereof such as low refractive index, low dispersion property, etc., as disclosed in JP-A-60-210545 or JP-A-63-144141.

Further, a glass described in JP-A-57-027941 is known as a low softening point glass (having a low glass transformation temperature). This fluorophosphate glass is a glass having a glass transformation temperature (Tg) of about 100° C., i.e. very low sortening point glass, but meets with low productivity because of containing a large amount of tin fluorides as a low boiling point compound, resulting in more vaporization during glass melting.

Thus, this glass is not considered suitable for mass production. The glass transformation temperature of about 100° C. is not considered practical as an optical glass.

The phosphate glass described in the former JP-A-02-116642 aims at a low softening point and can contain fluorine in an amount of up to 5%, but this glass does not have an object of positively adding fluorine to lower the softening point and the fluorine is only an additive component.

JP-B-59-033545 of Corning Co. (which will hereinafter be referred to as Corning Publication) discloses a low softenting point glass of fluorophosphate type for molding, having a glass transformation temperature (Tg) of at most about 350° C. This known invention is considered to be based on finding that when $Al_2O_3$ having hitherto been considered to markedly raise the glass transformation temperature (Tg) simultaneously contains fluorides in an amount of more than 3% of F as an analytical value, Tg of the glass is not markdely raised. And this publication states that it is important for obtaining a low softening point glass excellent in durability to maintain an atomic ratio of the analytical value of F: Al within a range of 0.75 to 5 and that even in Examples, the atomic ratio of F: Al is described. In Claims of the Corning Publication, there is shown % by weight on oxide basis, but this is determined by calculation, not from the component composition, but from the analytical value of the glass after melted.

In Tables 2 and 6 of the Corning Publication, there are shown residual ratios of F when melted under each condition, according to which it is apparent that there is a large dispersion over 9.11 to 69.5% and accordingly, the evaporation quantity of F is felt very large and not even. As one of factors thereof, it is considered that there is a high possibility of a reaction with a crucible. In the invention disclosed in the Corning Publication, there are used various crucibles, for example, a crucible of $SiO_2$ type very reactive with F or $Al_2O_3$ affecting the durability thereof, resulting in one factor that the resulting glass composition is fluctuated. Furthermore, in Examples, raw materials containing water of crystallization causing vaporization of $P_2O_5$ or F are used.

As described above, the Corning Publication does not have a sufficient disclosure, since in Claims, the analytical values of F and a part of Al and the atomic ratios of F: Al are only described and no analytical values of P, Li, Na, K, etc., which are important for lowering the softening point of the glass and have a large influence upon durability, are described, in spite of that the melting conditions are not constant and the final glass composition considered to be largely affected thereby.

Optional components, PbO and CdO are useful as a component for not only raising the refractive index but also giving a low softening point as disclosed in JP-B-40-014301 and are also used in about half of Examples of the Corning Publication, because the other components for giving a low softening point, such as F, P, Li, Na, K, etc., can be reduced by the use of PbO and CdO, which are very effective for lowering the softening point while simultaneously improving the durability. However, PbO or CdO is so poisonous that the use thereof tends to be avoided lately from optical glasses in view of the standpoint of protecting the environmental pollution, and thus it is not preferred to use PbO or CdO.

In the glass composition of phosphate type of JP-A-2003-026439 having lately been filed, the inventors have found that a considerable amount of $Al_2O_3$ can be incorporated without increasing the amount of $P_2O_5$ while increasing the amounts of $Li_2O$, $Na_2O$ and $K_2O$ components as essential components and thus reached an invention relating to a low softening point glass excellent in durability. The present invention is achieved by aiming at further lowering the softening point and improving the durability of the former glass composition and thus incorporating F, as an essential component, thereinto.

However, the present invention is considerably similar to the invention of the Corning Publication, as a whole, since the essential components of the glass composition of the former are same as those of the latter. The difference between the present invention and Corning Invention will now be illustrated:

In the Corning Publication, there are pointed out various problems as described in Prior Art. That is, claims thereof are represented by % by weight based on oxide basis, which is based on not a range calculated from the component composition but an analytical value of the glass obtained by melting, while on the other hand, the claims of the present invention are represented by % by weight based on oxide basis, calculated from the component compositions of Examples. That is, in the present invention, claims thereof are similarly represented by % by weight based on oxide basis, and accordingly, comparison of this with that described in the Corning Publication using the representation obtained from the analytical value of the glass is difficult. Since Examples show only the analytical values of F and Al and as described in Prior Art, have a number of problems relating to evaporation such as melting conditions, such a comparison is meaningless and in other words, the Corning Publication does not have a substantial disclosure of the composition of the present invention.

Thus, the comparison will now be carried out with % by weight based on oxide basis, calculated from the component compositions of Examples. In the present invention, furthermore, PbO, CdO, etc. capable of imparting a low softening point but having poisonous property being generally pointed out are not used from the standpoint of proofing the environmental pollution, so the comparison is concerned with the compositons of Examples free from PbO, CdO, etc.

In Table 1 are shown the composition ranges of weight percents on oxide basis, calculated from Examples of the present invention and Corning Publication. In claims of the Corning Publication, the composition comprises 30 to 75 wt % of $P_2O_5$, 3 to 25 wt % of $R_2O$, 3 to 20 wt % of $Al_2O_3$, more than 3 wt % to less than 24 wt % of F and 0.75 to 5 of F: Al. Accordingly, it is understood therefrom that this composition is largely different from the real composition range calculated from Examples.

It is apparent from Table 1 that in the present invention, the range of $P_2O_5$ is less than the lower limit of the Corning Publication, the range of $R_2O$ (R: Li, Na, K) is considerably more than the upper limit of the Corning Publication and $Li_2O$, $Na_2O$ and $K_2O$ are all contained as essential components. The upper limit of $Al_2O_3$ is considerably more than that of the Corning Publication, although partly overlapped in composition.

This is results of finding according to the present invention that a considerable amount of $Al_2O_3$ can be incorporated without increasing the amount of $P_2O_5$ while increasing the amounts of $Li_2O$, $Na_2O$ and $K_2O$ as essential components, and further lowering of the softening point and improvement of the durability can be realized by incorporating F as an essential component.

As described above, it is apparent that the present invention is different in composition from the invention described in the Corning Publication.

Accordingly, it is the first object of the present invention is to provide an optical glass for molding, in particular, being excellent in workability and chemical durability, and capable of being subjected to precise molding at a low temperature of, e.g., at most 400° C. and having a low transformation temperature (Tg) of at most 350° C. and a specific gravity (Sg) of at most 3.1.

It is the second object of the present invention is to provide with an excellent producibility, an optical glass having optical properties, i.e. refractive index (nd) of 1.43 to 1.55 and Abbe number (ν d) of 55 to 85.

DISCLOSURE OF INVENTION (1) An optical glass for molding, being excellent in chemical durability and having a transformation temperature (Tg) of at most 350° C. and a specific gravity (Sg) of at most 3.1, which is represented, in term of elements for making up the glass, by the following chemical composition (wt % on oxide basis, calculated from the component composition):

| | | |
|---|---|---|
| $P_2O_5$ | 34 to 50%, | |
| $Li_2O$ | 2 to 9%, | |
| $Na_2O$ | 7 to 28%, | |
| $K_2O$ | 3 to 27%, | |
| Sum of $R_2O$ | 17 to 41% | (R: Li, Na, K), |
| $Al_2O_3$ | 6.5 to 30%, | |
| ZnO | 0 to 22%, | |
| BaO | 0 to 21%, | |
| SrO | 0 to 18%, | |
| CaO | 0 to 16%, | |
| MgO | 0 to 14%, | |
| Sum of R'O | 0 to 34% | (R': Zn, Ba, Sr, Ca, Mg), |
| $ZrO_2$ | 0 to 1.5% and | |
| F | 1.5 to 32% | |

(2) An optical glass for molding, being excellent in chemical durability and having a transformation temperature (Tg) of at most 300° C. and a specific gravity (Sg) of at most 3.1, which is represented, in term of elements for making up the glass, by the following chemical composition (wt % on oxide basis, calculated from the component composition):

Preferred Embodiment

| | | |
|---|---|---|
| $P_2O_5$ | 39 to 47%, | |
| $Li_2O$ | 6 to 9%, | |
| $Na_2O$ | 7 to 15%, | |
| $K_2O$ | 3 to 5%, | |
| Sum of $R_2O$ | 17 to 26% | (R: Li, Na, K), |
| $Al_2O_3$ | 8.5 to 22%, | |
| ZnO | 0 to 17%, | |
| BaO | 0 to 17%, | |

| | -continued | |
|---|---|---|
| SrO | 0 to 12%, | |
| CaO | 0 to 10%, | |
| MgO | 0 to 5%, | |
| Sum of R'O | 0 to 32% | (R': Zn, Ba, Sr, Ca, Mg) and |
| F | 12 to 27% | |

The composition ranges of the basic application (Japanese Patent Application No. 2001-332531, WO 03/037813 A1) of the present invention is represented by mol % and claims of the present PCT application are represented by weight % on oxide basis, which are different but any of which are based on the component composition (wt %) in Examples.

Example 1 of the basic application will be illustrated.

For conversion of the representation of the component composition (mol %) in [Table 1] of the basic application into that by weight % on oxide basis, it is first returned to the component composition in [Table 6]. In this method, the mol % value of each component is multiplied by the molecular weight to give a sum total to be a denominator. Namely, the denominator will be 28.79×141.95+12.16×29.88+20.52×61.98+9.64×94.20+27.04×83.98+1.11×81.39+0.74×123.22=9082.34.

Then, the mol % value of each component is multiplied by the molecular weight to give a value to be a numerator, which is divided by the above described denominator and multiplied by 100 to give a component composition (wt %).

In the case of $P_2O_5$, for example, it will be:
{(28.79×141.95)÷9082.34}×100=45 (wt %)

Cf. [Table 6] in Basic Application.

As to the other components, the similar calculation is carried out. As such, all the components are subjected to the calculation to obtain wt % re-presentation shown in [Table 6] of the basic application.

Then, the component composition (wt %) is converted into a wt % re-presentation on oxide basis. In this method, the fluoride component in the component composition (wt %) is divided into cation and anion (F). For example, the fluoride used in Example 1 is only $AlF_3$: 25 wt %, which is divided into Al and F.

Since the molecular weight of $AlF_3$ is 83.98, the atomic weight of Al is 26.98 and the atomic weight of F is 19.00, the amount of Al in $AlF_3$: 25 wt % is 25×(26.98÷83.98) =8.03 wt % (atomic wt %) and the amount of F in $AlF_3$: 25 wt % is 25×{(19.00×3)÷83.98}=16.97 wt % (atomic wt %). This means that the proportion of Al in the component composition (wt %) is 8.03 wt % and that of F is 16.97 wt %, that is, 8.03 g of Al and 16.97 g of F are present in 100 g.

Then, if Al: 8.03 wt % in $AlF_3$ is all oxides, the amount of $Al_2O_3$ is to be obtained. Since the molecular weight of $Al_2O_3$ is 101.96, 2Al of which corresponds to 8.03 wt %, the amount of $Al_2O_3$ is 8.03+{(2×26.98)÷101.96}=15.17. (This teaches that when the Al component in $AlF_3$: 25 g is all oxides, $Al_2O_3$ is 15.17 g.)

When in Table 6, calculation is carried out to be 100% as a whole by substituting $AlF_3$: 25 with $Al_2O_3$: 15.17 in the component composition (wt %) of Example 1, the weight % representation on oxide basis of Example 1 in Table 7 of the present PCT application is given. In this case, the weight of F in 100 g expression is 16.97 g (Cf. Table 7, Example 1).

It is to be noted herein that conversion of from the component composition (mol % or wt %) to a weight % on oxide basis is possible but conversion of from the weight % representation on oxide basis to the component composition is not possible. (Since the weight % representation on oxide basis shows only the weight proportion of cation, it is not clear which cation is used for the fluoride only by this information and specification of the fluoride is impossible.)

Therefore, it is understood that representation of only the weight % on oxide basis does not disclose or teach the component composition.

BEST EMBODIMENT FOR CARRYING OUT INVENTION

The low softening point glass according to the present invention is a glass of phosphate type which can mainly be used for optical uses and pre-dominantly comprises $P_2O_5$—$Al_2O_3$—$R_2O$—F (R: Li, Na, K), and in particular, at least 6.5% of $Al_2O_3$ is incorporated as a durability improving component, with success, whereby to impart an excellent chemical durability and stability which is represented by a weight loss of at most 0.3 weight %, preferably at most 0.05 weight % in a durability test. This glass has a glass transformation temperature (Tg) of 230 to 350° C., molding temperature of 270 to 400° C. and optical characteristic values i.e. refractive index (nd) at d-line of 1.43 to 1.55 and Abbe number (ν d) of 55 to 85.

In a Chemical Durability Test employed herein, a glass sample (1.5×1.5×1.0 cm) is treated in boiled distilled water for 2 hours and during the same time, a weight loss is measured and represented by percent to the initial weight.

The reasons for limiting the composition range (% should be taken as those by weight % on oxide basis unless otherwise indicated) of each component of this low softening point, optical glass according to the present invention to the above described (1) are as follows:

$P_2O_5$ is a glass forming component, which is present in a proportion of 34 to 50%, since if less than 34%, glass formation is difficult, while if more than 50%, the durability is lowered. The preferred range is 39 to 47%.

$Li_2O$ is a component for improving the melting property of the glass and for lowering the softening temperature of the glass. If the proportion thereof is less than 2%, the above described effect is not sufficient, while if more than 9%, the durability and stability are deteriorated. The preferred range is 6 to 9%.

$Na_2O$ is a component for improving the melting property of the glass and for lowering the softening temperature, similar to $Li_2O$. If the proportion thereof is less than 7%, the above described effect is not sufficient, while if more than 28%, the stability and durability are deteriorated. The preferred range is 7 to 15%.

$K_2O$ is a component for improving the melting property of the glass and for lowering the softening temperature of the glass, not so as alkaline components ($Li_2O$, $Na_2O$). If the proportion thereof is less than 3%, the above described effect is not sufficient, while if more than 27%, the durability particularly is deteriorated. The preferred range is 3 to 5%.

The sum of $Li_2O$, $Na_2O$ and $K_2O$ is 17 to 41%. If the proportion thereof is less than 17%, the effect of improving the melting property of the glass and for lowering the softening temperature is not sufficient, while if more than 41%, the stability and durability are deteriorated. The preferred range is 17 to 26%.

$Al_2O_3$ has an effect of improving the durability. If the proportion is less than 6.5%, the effect thereof is not sufficient and if more than 30%, the melting property of the glass is deteriorated. The preferred range is 8.5 to 22%.

ZnO is a component for improving the melting property of the glass. If the proportion exceeds 22%, the stability is deteriorated. The preferred range is 0 to 17%.

BaO is a component for improving the melting property of the glass. If the proportion exceeds 21%, the stability is deteriorated. The preferred range is 0 to 17%.

SrO is a component for improving the melting property of the glass. If the proportion exceeds 18%, the stability is deteriorated. The preferred range is 0 to 12%.

CaO is a component for improving the melting property of the glass. If the proportion exceeds 16%, the stability is deteriorated. The preferred range is 0 to 10%.

MgO is a component for improving the melting property of the glass. If the proportion exceeds 14%, the stability is deteriorated. The preferred range is 0 to 5%.

The sum of ZnO, BaO, SrO, CaO and MgO (R'O) should be 0 to 34%, since if exceeding 34%, the stability is deteriorated. The preferred range is 0 to 32%.

$ZrO_2$ is a component for improving the durability. If the proportion exceeds 1.5%, the melting property of the glass is deteriorated.

F is a component for improving the melting property of the glass and for lowering the softening temperature of the glass. If the proportion thereof is less than 1.5%, the above described effect is not sufficient, while if more than 32%, vaporization and others are caused, resulting in difficulty of preparing the glass. The preferred range is 12 to 27%.

Production of the low softening point optical glass according to the present invention is carried out by a conventional glass production process, using as a raw material, ordinary glass raw materials such as salts such as metaphosphates, sodium carbonate, potassium carbonate, aluminum fluoride, sodium fluoride, etc. A transparent glass can be prepared by adequately melting these raw materials in a platinum crucible at a temperature of about 800 to 1100° C. and then casting the resulting adequately melted glass melt in a mold made of carbon, etc., thus obtaining a transparent glass. Then, the resulting glass is subjected to annealing at about glass transformation temperature, thus obtaining a thermally stable glass.

In these glasses, the glass transformation temperature is low, for example, about 230 to 350° C. and molding is carried out at about 270 to 400° C. The chemical durability thereof can be represented by a weight loss in distilled water in a range of at most 0.30%, which does not constitute any problem on practical use.

The following examples and comparative examples are given in order to illustrate the low softening point glass of present invention in detail without limiting the same.

EXAMPLES 1 TO 45

Using the corresponding metaphosphates, oxides, fluorides, carbonates, nitrates, etc., as a raw material of each component, the component compositions were mixed as shown in Tables 2, 3, 4, 5 and 6. These materials were weighed to give 100 g as a glass weight, adequately mixed, then charged in a platinum crucible, covered, melted for several hours in an electric furnace at a temperature of 800 to 1100° C., homogenized and refined by stirring and then poured into a metallic mold, followed by gradually cooling, to obtain a clear and homogeneous glass.

In Tables 7, 8, 9, 10 and 11 are shown compositions obtained by converting the component compositions of Tables 2, 3, 4, 5 and 6 into weight % on oxide basis.

In Tables 12, 13, 14, 15 and 16 are shown the thermal properties (glass transformation temperature (Tg), yielding point (At), thermal expansion coefficient (α) at 50–250° C.) and optical properties (refractive index (nd), Abbe number (ν d)), specific gravity (Sg) and data of the Chemical Durability Test of the resulting glasses. In the Chemical Durability Test employed herein, a glass sample (1.5×1.5×1.0 cm) was treated in boiled distilled water for 2 hours, during which a weight loss was measured and represented by percent to the initial weight.

In the composition of Example 43, the raw materials were mixed so as to give a glass weight of 30 g, melted at 900° C. for 30 minutes in an analogous manner to Comparative Example 1 and then the glass weight was measured to obtain a weight loss.

Thus, the weight loss of about 1.4% was confirmed. In Comparative Example 1, the weight loss reaches 15.9% by only fluorine this indicates that vaporization was suppressed in Example 43.

In the composition of Example 41, the raw materials were mixed so as to give a glass weight of 600 g and melted at 1000° C. for 2 hours. The melting was carried out in a similar manner three times to examine change of the refractive index and consequently it was found that the refractive index difference by nd was well in agreement with 0.00014.

COMPARATIVE EXAMPLE 1

Example 19 of the Corning Publication was employed as Comparative Example 1. The batch composition is shown in Table 6 and the weight % composition of oxide basis obtained from the batch composition is shown in Table 11. In Table 16, there are shown the main properties and analytical values shown in Table 2 of the Corning Publication.

TABLE 1

| Oxide Basis (wt %) | Composition Range Present Invention | JP-B-59-033545 Composition free from CdO, PbO |
|---|---|---|
| $P_2O_5$ | 34.58 to 49.9 | 50.71 to 79.89 |
| $Li_2O$ | 2.64 to 8.41 | 0 to 5.54 |
| $Na_2O$ | 7.34 to 27.24 | 0 to 7.52 |
| $K_2O$ | 3.24 to 26.53 | 0 to 12.24 |
| $R_2O$ | 17.86 to 40.71 | 9.36 to 16.04 |
| $Al_2O_3$ | 6.55 to 29.66 | 3.99 to 10.99 |
| ZnO | 0 to 21.4 | 0 to 24.83 |
| BaO | 0 to 20.21 | 0 to 34.20 |
| SrO | 0 to 17.02 | 0 to 26.09 |
| CaO | 0 to 15.15 | 0 to 18.53 |
| MgO | 0 to 13.57 | 0 to 14 |
| CdO | — | — |
| PbO | — | — |
| $ZrO_2$ | 0 to 1.19 | — |
| F | 1.81 to 31.99 | 10.06 to 42.45 |
| F/Al | 0.37 to 7.00 | 3.63 to 14.07 |

TABLE 2

| wt % | \multicolumn{10}{c}{Examples} |
| --- | --- | --- | --- | --- | --- | --- | --- | --- | --- | --- |
|  | 1 | 2 | 3 | 4 | 5 | 6 | 7 | 8 | 9 | 10 |
| $P_2O_5$ | 45 | 37 | 29 | 45 | 45 | 40 | 40 | 40 | 40 | 40 |
| $Li_2O$ | 4 | 4 | 4 | 4 |  | 4 | 4 | 4 | 4 |  |
| LiF |  |  |  |  | 10 |  |  |  |  | 4 |
| $Na_2O$ | 14 | 14 | 14 | 14 | 14 |  | 14 |  | 24 |  |
| NaF |  |  |  |  |  | 24 |  | 24 |  | 24 |
| $K_2O$ | 10 | 10 | 10 | 10 | 10 | 10 |  | 10 | 10 |  |
| KF |  |  |  |  |  |  | 20 |  |  | 10 |
| $Al_2O_3$ |  |  |  |  | 9 | 15 | 10 | 22 | 5 | 15 |
| $AlF_3$ | 25 | 33 | 41 | 17 | 1 | 7 | 12 |  | 17 | 7 |
| ZnO | 1 | 1 | 1 | 1 | 5 |  |  |  |  |  |
| $ZnF_2$ |  |  |  |  |  |  |  |  |  |  |
| BaO |  |  |  |  |  | 6 |  |  |  |  |
| $BaF_2$ |  |  |  | 8 |  |  |  |  |  |  |
| SrO |  |  |  |  |  |  |  |  |  |  |
| $SrF_2$ |  |  |  |  |  |  |  |  |  |  |
| CaO |  |  |  |  |  |  |  |  |  |  |
| $CaF_2$ |  |  |  |  |  |  |  |  |  |  |
| MgO |  |  |  |  |  |  |  |  |  |  |
| $MgF_2$ |  |  |  |  |  |  |  |  |  |  |
| $ZrO_2$ | 1 | 1 | 1 | 1 |  |  |  |  |  |  |
| Total | 100 | 100 | 100 | 100 | 100 | 100 | 100 | 100 | 100 | 100 |

TABLE 3

| wt % | \multicolumn{10}{c}{Examples} |
| --- | --- | --- | --- | --- | --- | --- | --- | --- | --- | --- |
|  | 11 | 12 | 13 | 14 | 15 | 16 | 17 | 18 | 19 | 20 |
| $P_2O_5$ | 30 | 40 | 40 | 45 | 45 | 45 | 45 | 45 | 40 | 40 |
| $Li_2O$ |  | 4 | 4 | 4 | 3 | 3 | 3 | 8 | 4 | 4 |
| LiF | 4 |  |  |  |  |  |  |  |  |  |
| $Na_2O$ |  | 14 | 14 |  | 7 | 7 | 25 |  |  |  |
| NaF | 24 | 10 | 10 | 24 | 25 |  |  | 14 | 21 | 18 |
| $K_2O$ |  | 10 | 10 | 10 | 5 | 5 | 5 | 10 | 10 | 10 |
| KF | 10 |  |  |  |  | 25 |  |  |  |  |
| $Al_2O_3$ | 10 | 5 |  | 10 | 15 | 15 | 17 | 20 | 15 | 13 |
| $AlF_3$ | 22 | 17 | 17 | 7 |  |  | 5 | 3 |  |  |
| ZnO |  |  |  |  |  |  |  |  | 10 |  |
| $ZnF_2$ |  |  |  |  |  |  |  |  |  |  |
| BaO |  |  |  |  |  |  |  |  |  | 15 |
| $BaF_2$ |  |  | 15 |  |  |  |  |  |  |  |
| SrO |  |  |  |  |  |  |  |  |  |  |
| $SrF_2$ |  |  |  |  |  |  |  |  |  |  |
| CaO |  |  |  |  |  |  |  |  |  |  |
| $CaF_2$ |  |  |  |  |  |  |  |  |  |  |
| MgO |  |  |  |  |  |  |  |  |  |  |
| $MgF_2$ |  |  |  |  |  |  |  |  |  |  |
| $ZrO_2$ |  |  |  |  |  |  |  |  |  |  |
| Total | 100 | 100 | 100 | 100 | 100 | 100 | 100 | 100 | 100 | 100 |

TABLE 4

| wt % | \multicolumn{10}{c}{Examples} |
| --- | --- | --- | --- | --- | --- | --- | --- | --- | --- | --- |
|  | 21 | 22 | 23 | 24 | 25 | 26 | 27 | 28 | 29 | 30 |
| $P_2O_5$ | 45 | 45 | 45 | 40 | 43 | 45 | 40 | 44 | 44 | 46 |
| $Li_2O$ | 4 | 4 | 4 | 4 | 4 | 4 | 4 | 5.5 | 5 | 6 |
| LiF |  |  |  |  |  |  | 2 |  |  |  |
| $Na_2O$ | 14 | 14 | 14 | 15 |  | 9 | 10 |  |  |  |
| NaF |  |  |  |  | 13 | 4 | 5 | 10 | 10 | 10 |
| $K_2O$ | 8 | 6 | 6 | 8 | 6 | 5 | 7 | 5.5 | 6 | 5 |
| KF |  |  |  |  |  |  |  |  |  |  |
| $Al_2O_3$ |  |  |  |  | 7 | 13 | 10 | 5 | 5 | 5 |

TABLE 4-continued

| | Examples | | | | | | | | | |
|---|---|---|---|---|---|---|---|---|---|---|
| wt % | 21 | 22 | 23 | 24 | 25 | 26 | 27 | 28 | 29 | 30 |
| AlF$_3$ | 25 | 25 | 21 | 22 | 10 | | 12 | 10 | 10 | 13 |
| ZnO | | | | | | | | 20 | | 15 |
| ZnF$_2$ | | | | 17 | | | 10 | | 20 | |
| BaO | | | | | | 20 | | | | |
| BaF$_2$ | | | | | | | | | | |
| SrO | | | 10 | | | | | | | |
| SrF$_2$ | | | | | | | | | | |
| CaO | | | 6 | | | | | | | |
| CaF$_2$ | | | | | | | | | | |
| MgO | | 4 | | | 11 | | | | | |
| MgF$_2$ | | | | | | | | | | |
| ZrO$_2$ | | | | | | | | | | |
| Total | 100 | 100 | 100 | 100 | 100 | 100 | 100 | 100 | 100 | 100 |

TABLE 5

| | Examples | | | | | | | | | |
|---|---|---|---|---|---|---|---|---|---|---|
| wt % | 31 | 32 | 33 | 34 | 35 | 36 | 37 | 38 | 39 | 40 |
| P$_2$O$_5$ | 40 | 40 | 40 | 40 | 40 | 40 | 43 | 40 | 35 | 40 |
| Li$_2$O | 5 | 5 | 5 | 5 | 5 | 5 | 4 | 5 | 5 | 5 |
| LiF | 1 | 1 | 1 | 1 | 1 | 1 | 5 | 2 | 2 | 2 |
| Na$_2$O | 5 | 5 | 5 | 5 | 5 | 5 | 6 | | | |
| NaF | 11 | 11 | 11 | 11 | 11 | 9 | 6 | 10 | 10 | 10 |
| K$_2$O | 4 | 4 | 4 | 4 | 4 | 4 | 5 | 3 | 3 | 3 |
| KF | | | | | | | | | | |
| Al$_2$O$_3$ | | | | | | 5 | 10 | | | |
| AlF$_3$ | 22 | 24 | 16 | 24 | 16 | 13 | | 25 | 13 | 25 |
| ZnO | | | | | | | | 10 | 10 | 10 |
| ZnF$_2$ | | | | | | | | | | |
| BaO | | | | | | | | | | |
| BaF$_2$ | | | | | | | 21 | | 5 | |
| SrO | | | | | | | | | 5 | |
| SrF$_2$ | | | | 10 | 18 | | | | 5 | 5 |
| CaO | | | | | | | | 5 | 3 | |
| CaF$_2$ | | | 10 | 18 | | | | | | |
| MgO | | | | | | | | | 2 | |
| MgF$_2$ | | 12 | | | | 18 | | | 2 | |
| ZrO$_2$ | | | | | | | | | | |
| Total | 100 | 100 | 100 | 100 | 100 | 100 | 100 | 100 | 100 | 100 |

TABLE 6

| | Examples | | | | | | Comparative |
|---|---|---|---|---|---|---|---|
| wt % | 41 | 42 | 43 | 44 | 45 | wt % | Example 1 |
| P$_2$O$_5$ | 35 | 35 | 40 | 40 | 35 | Al(PO$_3$)$_3$ | 44.7 |
| Li$_2$O | 5 | 5 | 5 | 5 | 5 | KPF$_6$ | 29 |
| LiF | 2 | 2 | 2 | 2 | 2 | NaPF$_6$ | 26.3 |
| Na$_2$O | | | | 5 | 5 | | |
| NaF | 10 | 10 | 10 | 10 | 10 | | |
| K$_2$O | 3 | 3 | 3 | 3 | 3 | | |
| KF | | | | | | | |
| Al$_2$O$_3$ | | | | | | | |
| AlF$_3$ | 15 | 15 | 10 | 25 | 30 | | |
| ZnO | 5 | 5 | 15 | | | | |
| ZnF$_2$ | | | | | | | |
| BaO | 10 | 5 | | | | | |
| BaF$_2$ | | 5 | | | | | |
| SrO | | 5 | 10 | 5 | 5 | | |
| SrF$_2$ | | 5 | | | | | |
| CaO | 5 | 5 | 5 | 5 | 5 | | |
| CaF$_2$ | | 5 | | | | | |
| MgO | | | | | | | |
| MgF$_2$ | | 5 | | | | | |
| ZrO$_2$ | | | | | | | |
| Total | 100 | 100 | 100 | 100 | 100 | Total | 100 |

TABLE 7

| Oxide Basis wt % | Examples | | | | | | | | | |
|---|---|---|---|---|---|---|---|---|---|---|
| | 1 | 2 | 3 | 4 | 5 | 6 | 7 | 8 | 9 | 10 |
| $P_2O_5$ | 49.90 | 42.52 | 34.58 | 48.74 | 47.18 | 43.97 | 43.71 | 42.69 | 42.87 | 45.78 |
| $Li_2O$ | 4.44 | 4.60 | 4.77 | 4.34 | 6.05 | 4.40 | 4.37 | 4.27 | 4.29 | 2.64 |
| $Na_2O$ | 15.53 | 16.09 | 16.69 | 15.17 | 14.69 | 19.47 | 15.30 | 18.90 | 25.71 | 20.27 |
| $K_2O$ | 11.09 | 11.49 | 11.92 | 10.83 | 10.48 | 10.99 | 17.72 | 10.67 | 10.71 | 9.28 |
| $Al_2O_3$ | 16.83 | 23.01 | 29.66 | 11.18 | 10.06 | 21.16 | 18.89 | 23.47 | 16.42 | 22.03 |
| ZnO | 1.10 | 1.14 | 1.19 | 1.08 | 5.25 | | | | | |
| BaO | | | | 7.58 | 6.29 | | | | | |
| SrO | | | | | | | | | | |
| CaO | | | | | | | | | | |
| MgO | | | | | | | | | | |
| $ZrO_2$ | 1.11 | 1.15 | 1.19 | 1.08 | | | | | | |
| Total | 100 | 100 | 100 | 100 | 100 | 100 | 100 | 100 | 100 | 100 |
| Weight of F in 100 g (g) | 16.97 | 22.40 | 27.83 | 13.27 | 8.00 | 15.61 | 14.68 | 10.86 | 11.54 | 21.81 |

TABLE 8

| Oxide Basis wt % | Examples | | | | | | | | | |
|---|---|---|---|---|---|---|---|---|---|---|
| | 11 | 12 | 13 | 14 | 15 | 16 | 17 | 18 | 19 | 20 |
| $P_2O_5$ | 36.81 | 44.10 | 43.75 | 49.47 | 48.16 | 47.24 | 45.91 | 47.28 | 42.33 | 41.98 |
| $Li_2O$ | 2.83 | 4.41 | 4.38 | 4.40 | 3.20 | 3.14 | 3.05 | 8.41 | 4.24 | 4.20 |
| $Na_2O$ | 21.74 | 23.57 | 15.32 | 19.47 | 27.24 | 7.34 | 25.51 | 10.86 | 16.40 | 13.95 |
| $K_2O$ | 9.95 | 11.02 | 10.93 | 10.99 | 5.35 | 26.53 | 5.10 | 10.51 | 10.58 | 10.49 |
| $Al_2O_3$ | 28.67 | 16.89 | 11.28 | 15.66 | 16.06 | 15.75 | 20.43 | 22.93 | 15.88 | 13.64 |
| ZnO | | | | | | | | | 10.58 | |
| BaO | | | 14.35 | | | | | | | 15.74 |
| SrO | | | | | | | | | | |
| CaO | | | | | | | | | | |
| MgO | | | | | | | | | | |
| $ZrO_2$ | | | | | | | | | | |
| Total | 100 | 100 | 100 | 100 | 100 | 100 | 100 | 100 | 100 | 100 |
| Weight of F in 100 g (g) | 31.99 | 16.06 | 14.79 | 15.61 | 11.31 | 8.18 | 3.39 | 8.37 | 9.50 | 8.14 |

TABLE 9

| Oxide Basis wt % | Examples | | | | | | | | | |
|---|---|---|---|---|---|---|---|---|---|---|
| | 21 | 22 | 23 | 24 | 25 | 26 | 27 | 28 | 29 | 30 |
| $P_2O_5$ | 49.90 | 49.90 | 49.04 | 43.79 | 48.29 | 45.48 | 43.96 | 47.07 | 49.32 | 49.86 |
| $Li_2O$ | 4.44 | 4.44 | 4.36 | 4.38 | 4.50 | 4.05 | 5.65 | 5.90 | 5.60 | 6.51 |
| $Na_2O$ | 15.53 | 15.53 | 15.26 | 16.42 | 10.78 | 12.08 | 15.05 | 7.90 | 8.28 | 8.00 |
| $K_2O$ | 8.87 | 6.65 | 6.54 | 8.75 | 6.74 | 5.05 | 7.69 | 5.89 | 6.73 | 5.42 |
| $Al_2O_3$ | 16.83 | 16.82 | 13.90 | 14.62 | 14.68 | 13.14 | 19.00 | 11.85 | 12.41 | 13.96 |
| ZnO | | | | | 15.02 | | | 8.64 | 21.40 | 17.65 | 16.25 |
| BaO | | | | | | 20.21 | | | | |
| SrO | | | 10.90 | | | | | | | |
| CaO | | 6.66 | | | | | | | | |
| MgO | 4.43 | | | 12.03 | | | | | | |
| $ZrO_2$ | | | | | | | | | | |
| Total | 100 | 100 | 100 | 100 | 100 | 100 | 100 | 100 | 100 | 100 |
| Weight of F in 100 g (g) | 16.97 | 16.97 | 14.25 | 14.93 | 18.92 | 1.81 | 15.55 | 11.31 | 18.66 | 13.35 |

TABLE 10

| Oxide Basis wt % | Examples | | | | | | | | | |
|---|---|---|---|---|---|---|---|---|---|---|
| | 31 | 32 | 33 | 34 | 35 | 36 | 37 | 38 | 39 | 40 |
| $P_2O_5$ | 47.73 | 47.38 | 46.88 | 46.78 | 45.85 | 46.65 | 45.90 | 46.14 | 39.21 | 46.60 |
| $Li_2O$ | 6.65 | 6.60 | 6.53 | 6.52 | 6.39 | 6.50 | 7.35 | 7.10 | 6.90 | 7.17 |
| $Na_2O$ | 15.65 | 15.53 | 15.37 | 15.34 | 15.03 | 13.58 | 11.14 | 8.52 | 8.28 | 8.61 |
| $K_2O$ | 4.77 | 4.74 | 4.69 | 4.68 | 4.58 | 4.66 | 5.34 | 3.46 | 3.36 | 3.49 |
| $Al_2O_3$ | 15.94 | 17.25 | 11.38 | 17.04 | 11.13 | 15.03 | 10.67 | 17.50 | 8.85 | 17.68 |
| ZnO | | | | | | | | 11.53 | 11.20 | 11.64 |
| BaO | | | | | | | 19.60 | | 4.91 | |
| SrO | | | | 9.65 | 17.02 | | | | 10.23 | 4.81 |
| CaO | | 8.50 | 15.15 | | | | | 5.76 | 3.36 | |
| MgO | 9.26 | | | | | 13.57 | | | 3.70 | |
| $ZrO_2$ | | | | | | | | | | |
| Total | 100 | 100 | 100 | 100 | 100 | 100 | 100 | 100 | 100 | 100 |
| Weight of F in 100 g (g) | 27.96 | 26.87 | 25.33 | 25.02 | 22.01 | 24.61 | 10.93 | 22.96 | 18.63 | 24.47 |

TABLE 11

| Oxide Basis wt % | Examples | | | | | Oxide Basis wt % | Comparative Example 1 |
|---|---|---|---|---|---|---|---|
| | 41 | 42 | 43 | 44 | 45 | | |
| $P_2O_5$ | 39.25 | 40.00 | 43.20 | 46.14 | 41.29 | $P_2O_5$ | 73.62 |
| $Li_2O$ | 6.91 | 7.04 | 6.65 | 7.10 | 7.27 | $Na_2O$ | 6.12 |
| $Na_2O$ | 8.29 | 8.45 | 7.98 | 14.27 | 14.60 | $K_2O$ | 9.36 |
| $K_2O$ | 3.37 | 3.43 | 3.24 | 3.46 | 3.54 | $Al_2O_3$ | 10.89 |
| $Al_2O_3$ | 10.22 | 10.41 | 6.55 | 17.50 | 21.50 | | |
| ZnO | 5.61 | 5.72 | 16.19 | | | | |
| BaO | 16.12 | 5.72 | | | | | |
| SrO | 4.63 | 5.72 | 10.80 | 5.77 | 5.90 | | |
| CaO | 5.60 | 9.82 | 5.39 | 5.76 | 5.90 | | |
| MgO | | 3.70 | | | | | |
| $ZrO_2$ | | | | | | | |
| Total | 100 | 100 | 100 | 100 | 100 | Total | 100 |
| Weight of F in 100 g (g) | 18.77 | 21.65 | 12.78 | 22.96 | 26.35 | Weight of F in 100 g (g) | 36 |

TABLE 12

| | Examples | | | | | | | | | |
|---|---|---|---|---|---|---|---|---|---|---|
| | 1 | 2 | 3 | 4 | 5 | 6 | 7 | 8 | 9 | 10 |
| Tg (° C.) | 308 | 329 | 348 | 276 | 299 | 332 | 316 | 326 | 287 | 336 |
| At (° C.) | 342 | 366 | 374 | 309 | 331 | 358 | 342 | 354 | 317 | 372 |
| $\alpha 50$–$250°$ C. ($\times 10^{-7°}$ C.$^{-1}$) | 195 | 193 | 185 | 218 | 192 | 188 | 197 | 180 | 219 | 193 |
| Loss Ratio (%) | 0.009 | 0.004 | 0.092 | 0.164 | 0.097 | 0.009 | 0.031 | 0.027 | 0.023 | 0.007 |
| Specific Gravity (Sg.) | 2.71 | 2.77 | 2.83 | 2.82 | 2.8 | 2.75 | 2.71 | 2.7 | 2.68 | 2.75 |
| nd | 1.47779 | 1.46673 | 1.45547 | 1.48671 | 1.51066 | 1.48492 | 1.48087 | 1.49223 | 1.48078 | 1.46389 |
| nF − nC | 0.00652 | 0.00614 | 0.0057 | 0.00684 | 0.00761 | 0.00664 | 0.00659 | 0.00705 | 0.00693 | 0.00609 |
| vd | 73.3 | 76 | 79.9 | 71.2 | 67.1 | 73 | 73 | 69.8 | 69.4 | 76.2 |
| F/Al Ratio | 3.00 | 3.00 | 3.00 | 3.45 | 2.24 | 2.18 | 2.28 | 1.33 | 2.02 | 3.04 |

TABLE 13

| | Examples | | | | | | | | | |
|---|---|---|---|---|---|---|---|---|---|---|
| | 11 | 12 | 13 | 14 | 15 | 16 | 17 | 18 | 19 | 20 |
| Tg (° C.) | 316 | 298 | 269 | 316 | 328 | 322 | 317 | 340 | 320 | 319 |
| At (° C.) | 352 | 327 | 299 | 350 | 354 | 351 | 351 | 365 | 344 | 356 |
| $\alpha 50$–$250°$ C. | 209 | 223 | 228 | 203 | 201 | 196 | 191 | 163 | 185 | 174 |

TABLE 13-continued

| | Examples | | | | | | | | | |
|---|---|---|---|---|---|---|---|---|---|---|
| | 11 | 12 | 13 | 14 | 15 | 16 | 17 | 18 | 19 | 20 |
| ($\times 10^{-7\circ}$ C.$^{-1}$) | | | | | | | | | | |
| Loss Ratio (%) | 0.025 | 0.079 | 0.086 | 0.03 | 0.008 | 0.046 | 0.032 | 0.003 | 0.007 | 0.008 |
| Specific Gravity (Sg.) | 2.78 | 2.71 | 2.86 | 2.69 | 2.71 | 2.65 | 2.62 | 2.67 | 2.83 | 2.94 |
| nd | 1.43269 | 1.4716 | 1.48095 | 1.47931 | 1.48658 | 1.49151 | 1.49904 | 1.50916 | 1.50624 | 1.5148 |
| nF − nC | 0.00526 | 0.0065 | 0.00669 | 0.00659 | 0.00694 | 0.00691 | 0.00766 | 0.0073 | 0.00756 | 0.00753 |
| νd | 82.3 | 72.6 | 71.9 | 72.7 | 70.1 | 71.1 | 65.1 | 69.7 | 67 | 68.4 |
| F/Al Ratio | 3.68 | 2.81 | 3.85 | 2.94 | 2.02 | 1.46 | 0.45 | 1.03 | 1.70 | 1.68 |

TABLE 14

| | Examples | | | | | | | | | |
|---|---|---|---|---|---|---|---|---|---|---|
| | 21 | 22 | 23 | 24 | 25 | 26 | 27 | 28 | 29 | 30 |
| Tg (° C.) | 329 | 317 | 305 | 350 | 287 | 350 | 339 | 326 | 277 | 324 |
| At (° C.) | 368 | 358 | 343 | 385 | 323 | 386 | 369 | 354 | 306 | 360 |
| α50–250° C. ($\times 10^{-7\circ}$ C.$^{-1}$) | 182 | 181 | 192 | 170 | 184 | 164 | 171 | 153 | 185 | 155 |
| Loss Ratio (%) | 0.007 | 0.007 | 0.01 | 0.037 | 0.022 | 0.005 | 0 | 0.004 | 0.042 | 0.006 |
| Specific Gravity (Sg.) | 2.72 | 2.74 | 2.82 | 2.78 | 2.85 | 3 | 2.85 | 2.98 | 2.87 | 2.9 |
| nd | 1.47722 | 1.4827 | 1.48796 | 1.48998 | 1.4824 | 1.54259 | 1.49691 | 1.52052 | 1.48903 | 1.51049 |
| nF − nC | 0.0062 | 0.00648 | 0.00879 | 0.00677 | 0.00678 | 0.00816 | 0.00702 | 0.00831 | 0.00697 | 0.00733 |
| νd | 77 | 74.5 | 55.5 | 72.4 | 71.2 | 66.5 | 70.8 | 62.6 | 70.2 | 69.6 |
| F/Al Ratio | 3.00 | 3.00 | 3.00 | 3.00 | 3.88 | 0.37 | 2.41 | 2.74 | 4.52 | 2.78 |

TABLE 15

| | Examples | | | | | | | | | |
|---|---|---|---|---|---|---|---|---|---|---|
| | 31 | 32 | 33 | 34 | 35 | 36 | 37 | 38 | 39 | 40 |
| Tg (° C.) | 292 | 254 | 237 | 255 | 234 | 326 | 318 | 295 | 274 | 284 |
| At (° C.) | 318 | 287 | 264 | 285 | 261 | 364 | 350 | 329 | 311 | 314 |
| α50–250° C. ($\times 10^{-7\circ}$ C.$^{-1}$) | 197 | 215 | 259 | 228 | 272 | 182 | 186 | 164 | 181 | 182 |
| Loss Ratio (%) | 0.062 | 0.27 | 0.22 | 0.19 | 0.27 | 0.045 | 0.012 | 0.008 | 0.007 | 0.02 |
| Specific Gravity (Sg.) | 2.71 | 2.71 | 2.7 | 2.79 | 2.84 | 2.76 | 2.97 | 2.87 | 2.98 | 2.9 |
| nd | 1.46083 | 1.45388 | 1.45974 | 1.45507 | 1.46283 | 1.46517 | 1.51682 | 1.48189 | 1.5034 | 1.47619 |
| nF − nC | 0.006 | 0.00574 | 0.00619 | 0.0059 | 0.00618 | 0.006 | 0.00739 | 0.00647 | 0.00711 | 0.00638 |
| νd | 76.8 | 79.1 | 74.3 | 77.1 | 74.9 | 77.5 | 69.9 | 74.5 | 70.8 | 74.6 |
| F/Al Ratio | 5.62 | 4.95 | 7.00 | 4.61 | 6.08 | 5.12 | 2.93 | 4.06 | 6.33 | 4.33 |

TABLE 16

| | Examples | | | | | Comparative |
|---|---|---|---|---|---|---|
| | 41 | 42 | 43 | 44 | 45 | Example 1 |
| Tg (° C.) | 260 | 282 | 280 | 295 | 294 | 290 |
| At (° C.) | 294 | 316 | 317 | 331 | 331 | |
| α50–250° C. ($\times 10^{-7\circ}$ C.$^{-1}$) | 197 | 185 | 175 | 182 | 190 | |
| Loss Ratio (%) | 0.008 | 0.007 | 0.006 | 0.015 | 0.004 | |
| Specific Gravity (Sg.) | 3.07 | 2.98 | 3.06 | 2.8 | 2.82 | |
| F Batch Weight | | | | | | 36 |
| F Analytic Value | | | | | | 18.1 |
| nd | 1.49628 | 1.48993 | 1.52008 | 1.47162 | 1.46434 | 1.45 |
| nF − nC | 0.00682 | 0.00663 | 0.00763 | 0.00617 | 0.0059 | |
| νd | 72.8 | 73.9 | 68.2 | 76.4 | 78.7 | |
| F/Al Ratio | 5.53 | 6.38 | 5.65 | 4.06 | 3.88 | 11.13 |

Utility of Present Invention of Commercial Scale

As illustrated above, the inventors have tried to develop a glass of fluorophosphate type capable of being subjected to molding at a temperature of at most 400° C. and consequently have reached an epoch-making glass composition.

According to the present invention, it is considered that a micro optical element can be molded with high producibility, which has hitherto been considered difficult. Furthermore, the optical glass of the present invention is so excellent in chemical durability that it is of high practical value.

The invention claimed is:

1. An optical glass for molding, being excellent in chemical durability and having a transformation temperature (Tg) of at most 350° C., a chemical durability represented by a weight loss in distilled water in a range of at most 0.30%, and a specific gravity (Sg) of at most 3.1, which is represented, in term of elements for making up the glass, by the following chemical composition (wt % on oxide basis, calculated from the component composition):

| | | |
|---|---|---|
| $P_2O_5$ | 39 to 47%, | |
| $Li_2O$ | 2 to 9%, | |
| $Na_2O$ | 7 to 28%, | |
| $K_2O$ | 3 to 27%, | |
| Sum of $R_2O$ | 17 to 41% | (R: Li, Na, K), |
| $Al_2O_3$ | 6.5 to 30%, | |
| ZnO | 0 to 22%, | |
| BaO | 0 to 17%, | |
| SrO | 0 to 18%, | |
| CaO | 0 to 16%, | |
| MgO | 0 to 14%, | |
| Sum of R'O | 0 to 34% | (R': Zn, Ba, Sr, Ca, Mg), |
| $ZrO_2$ | 0 to 1.5% and | |
| F | 1.5 to 32%. | |

* * * * *